Dec. 3, 1963     D. L. SHINN     3,113,198
DEVICE FOR HEAT SEALING

Filed May 31, 1960     2 Sheets-Sheet 1

INVENTOR.
DALTON L. SHINN
BY
Buckhorn, Cheatham & Blore
ATTORNEYS,

United States Patent Office 3,113,198
Patented Dec. 3, 1963

3,113,198
DEVICE FOR HEAT SEALING
Dalton L. Shinn, Camas, Wash., assignor to Crown Zellerbach Corporation, San Francisco, Calif., a corporation of Nevada
Filed May 31, 1960, Ser. No. 32,900
7 Claims. (Cl. 219—20)

The present invention relates to methods and devices for heat sealing layers of material such as polyethylene, polypropylene, cellophane, wax paper and other heat sealable plastic materials.

Machines have been devised to heat seal materials such as mentioned above so as to form packages or wrappings about objects. A common problem in all of such machines is the control of the heat applied to the material for if insufficient heat is provided, an incomplete or no seal at all results and if too much heat is applied, the wrapping material may be injured. The problem is accentuated with the newer plastic materials which have sharper melting points and permit less variance in the temperature utilized to effect heat sealing thereof. Because of certain inherent characteristics of the heating units provided heretofore, elaborate temperature control systems have been necessary to maintain the desired temperature. Certain other limitations are also present in such prior heating units and which the device of the invention does not possess.

Accordingly, it is an object of the present invention to provide a new and improved heat sealing unit.

More specifically, it is an object of the present invention to provide a heat sealing unit having a heating unit which may be easily maintained within predetermined temperature limits.

A still further object of the invention is to provide a heat sealing unit with which a simple and efficient temperature control system may be utilized to maintain a desired temperature thereof.

Another object of the present invention is to provide a new and improved heat sealing unit that is rugged and which is not subject to failure because of burn out of heater elements or the like.

Still another object of the invention is to provide a heat sealing unit that can be heated rapidly and which will cool rapidly.

A further object is to provide a new and improved control circuit for a heat sealing device.

A still further object is to provide a new and improved method of heat sealing heat sealable materials.

Other objects and advantages will become more apparent hereinafter.

In accordance with the illustrated embodiment, the device of the present invention comprises a generally rectangular body member upon which is mounted a sheet-like electrical resistance type heater element. The heater element extends across one face of the body member and up and around the opposite ends of the body. The opposite ends of the heater element are secured to heavy metal headers to which electrical connections can be made. A temperature sensing element is secured to the unexposed surface of the heater element and the signals therefrom are utilized to control the circuit connected to the heater element so as to control the temperature thereof.

For a more detailed description of the invention reference is made to the following portion of the specification and the drawings wherein.

Figure 1:
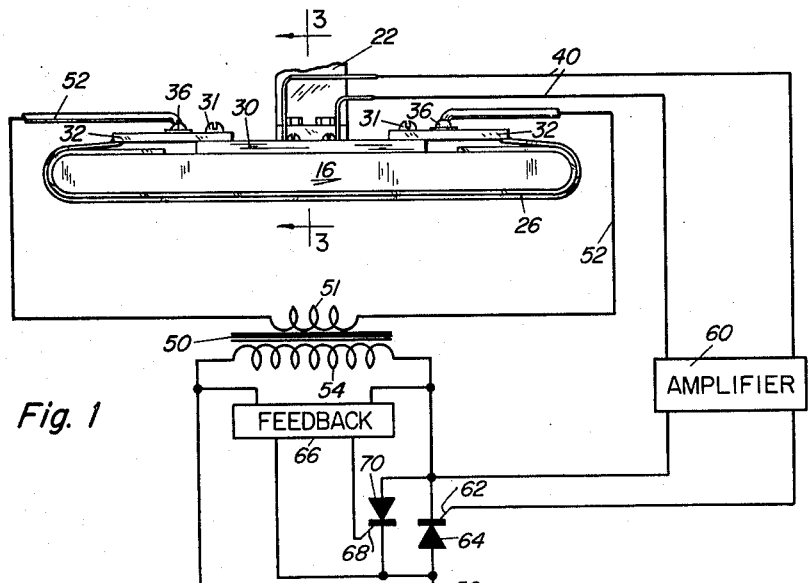
FIG. 1 is a side elevational view somewhat diagrammatic and fragmentary in character of a heat sealing unit made in accordance with the present invention.
Figure 2:
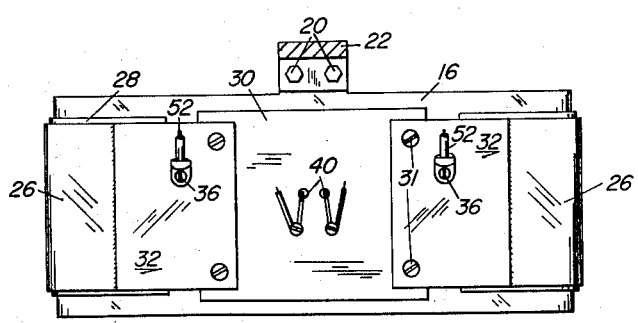
FIG. 2 is a plan view of the heat sealing unit.

Referring to the drawings, the heating unit of the invention comprises an elongate, generally rectangular metal body member 16 having rounded ends and a laterally extending mounting portion 18 by which it may be secured by bolts 20 or other suitable means to a support indicated at 22 on the machine with which the unit is utilized. It will be understood that the heating unit of the invention can be utilized in conjunction with a backing plate or other means for holding the material or object to be heat sealed for a predetermined period of time and since such means are well known to the art they have not been shown herein.

The body member 16 is provided with a broad, flat face 24 lengthwise of which extends a sealing plate comprising a sheet-like electrical resistance type heater element 26, the opposite ends of which extend up and around each of the opposite ends of the body member. The sheet 26 is preferably formed of stainless steel or other metal alloy having relatively high electrical resistance and is insulated from the body member 16 by a thin layer of heat resistant insulation 28.

Secured to the surface of the body member 16 opposite the face 24 is a terminal block 30 which preferably is adhesively bonded to the body member 16. Secured to the terminal block 30 by screws 31 or similar means are headers 32 comprising relatively thick pieces of copper, brass or other highly conductive metal. The headers 32 are preferably of substantially the same width as the sheet 26 and are brazed or otherwise suitably fastened one to each of the opposite ends of the sheet so as to provide a secure mechanical and a good electrical connection between the ends of the sheet and the headers. Contact posts 36 are provided on the headers for connecting the same to a source of electrical energy.

Figure 3:
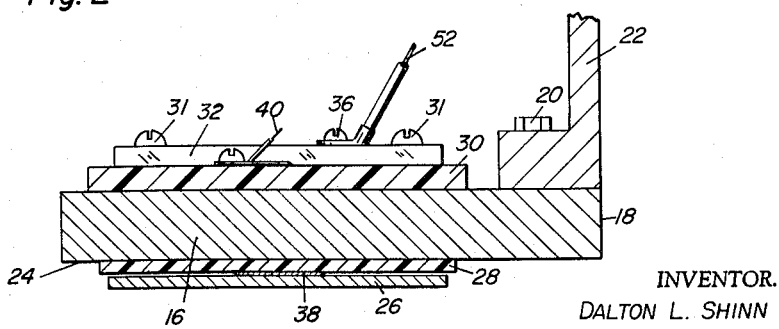
FIG. 3 is an enlarged sectional view taken along line 3—3 of FIG. 1.

To detect the temperature of the heater element 26 a wafer type temperature sensing element 38 is bonded by a heat resistant adhesive directly to the surface of the sheet 26 facing the body member 16. An example of a suitable sensing element is a coil resistance type sold under the trademark "RdF STIKON." Such units are only a few thousandths of an inch in thickness and thus the thickness of the element 38 is exaggerated in FIG. 3. The resistance of such elements varies with the temperature and thus they can be utilized to provide a control signal for applying electrical power to the heater element. Leads 40 from the sensing element 38 extend upwardly through suitable openings in the insulation 28, body member 16 and terminal block 30.

Means are provided to supply a controlled amount of low voltage electrical power to the sheet 26 so as to maintain the temperature thereof within predetermined limits. The source of electrical energy may comprise a transformer 50, the secondary 51 of which is connected by leads 52 to the contact posts 36.

Switching means responsive to the signals of the sensing element 38 are provided for controlling the supply of power to the transformer primary 54. Referring first to FIG. 1, the sensing element 38 (see FIG. 3) is connected to an amplifier indicated generally at 60 which receives and amplifies the signal generated by the sensing element 38 upon a drop in the temperature of the heater element 26. The amplified signal is applied to the gate 62 of a silicon controlled rectifier 64 connected in the line 56 to trigger the rectifier so that current will flow therethrough during the half cycle the anode of the rectifier is positive relative to its cathode. Current will, of course, also flow through the transformer primary energizing the secondary 51 to cause current to flow through the heater element 26 to heat the same. A part of the pulse through the rectifier 64 is passed through what may be termed a feed back circuit indicated generally in FIG. 1 at 66 which generates a signal applied to the gate 68 of another silicon controlled rectifier 70 connected in parallel to the rectifier 64 but in reverse position relative thereto. The signal at the gate 68 triggers the rectifier 70 so that it will conduct during the negative half cycle of the alternating current applied to the leads 56, 58. Thus current flows through the rectifier 64 only if a signal is received from the sensing element 38 and amplifier 60 and current will flow through the rectifier 70 only if it is triggered by a passage of current through the rectifier 64.

Figure 4:
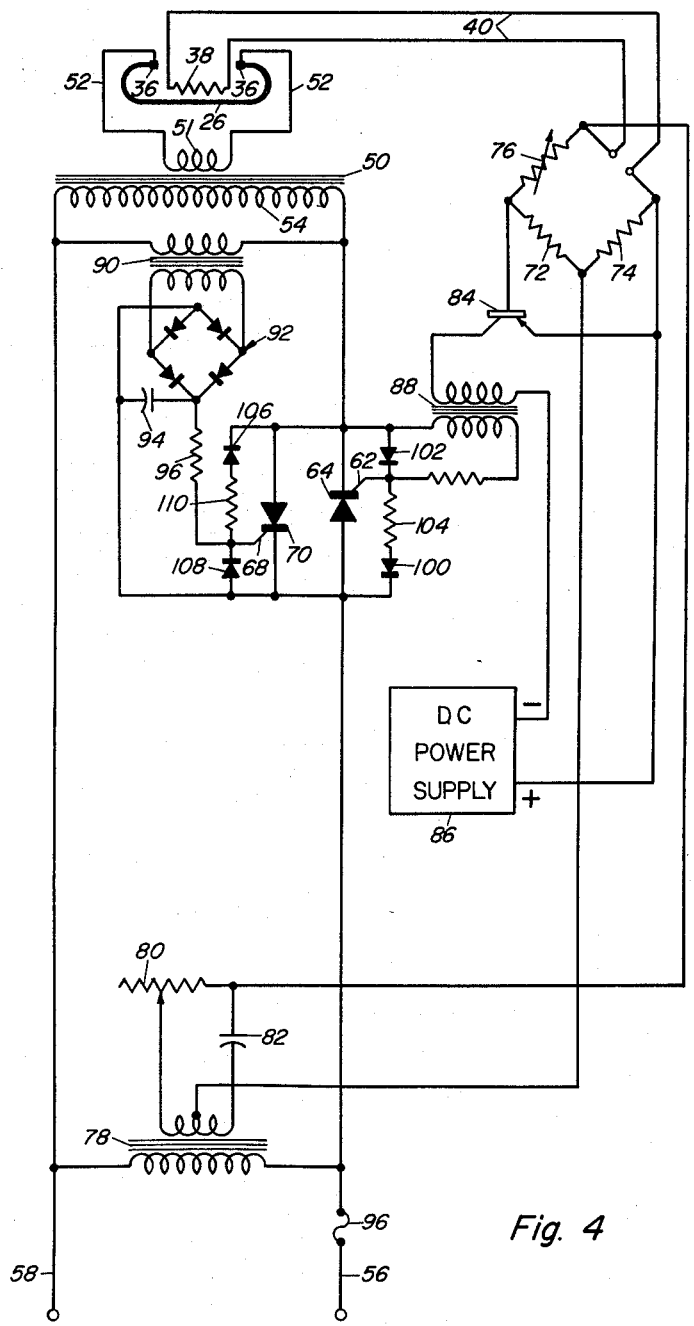
FIG. 4 is a diagram of the control circuit of the invention.

The complete circuit will now be described with reference to FIG. 4. The temperature sensing element 38 is connected in an A.C. bridge having two fixed resistors 72, 74 and a variable resistor 76 which permits the bridge to be balanced for different desired operating temperatures of the heater element 26. The bridge is supplied with power from an alternating current source through a transformer 78 and a phase shifting circuit including a variable resistor 80 and a condenser 82, the purpose of which will be explained later. Connected across the bridge circuit is a transistor 84 which is supplied with power from a suitable D.C. power supply 86 connected to the transistor through the primary of a transformer 88. If the temperature of the heater element 38 should drop below the predetermined minimum temperature desired therefor, the resulting decrease in the resistance of the sensing element 38 will unbalance the bridge circuit and a signal will appear at the transistor 84. This signal will be amplified by the transistor and will appear across the primary of the transformer 88 to generate a signal in the secondary thereof. This signal is applied to the gate 62 of the silicon controlled rectifier 64 which causes the rectifier to conduct. The phase shift condenser 82 and resistor 80 in the A.C. power supply for the bridge are provided so as to enable the signal from the bridge to be timed to arrive at the gate 62 just the anode of the rectifier 64 becomes positive. This will cause the rectifier to conduct for the full half cycle of power rather than commencing at some point during the cycle and which would cause an undesirably steep voltage rise to appear on the transformer primary 54. During the half cycle the rectifier 64 conducts, full line voltage will be applied across the primary winding 54 inducing current flow in the secondary winding 51 of the transformer 50 and through the heater element 26. Full line voltage is also applied across the primary winding of a transformer 90, the secondary winding of which is connected to a full wave bridge rectifier 92. The output of the bridge rectifier 92 is fed to a condenser 94 connected through a resistor 96 to the gate 68 of the silicon controlled rectifier 70. The time constant of this latter circuit is such that at the time the cathode of the rectifier 70 becomes negative a gating signal is present at the gate 68, such gating signal resulting from the action of the discharging condenser to render the rectifier conducting through the full half cycle. As the succeeding half cycle of current commences and the anode of the rectifier 64 becomes positive, it will fire only if a signal appears at the gate 62 thereof by reason of the sensing element 38 calling for heat. If it does not fire neither will the rectifier 70 since the condenser 94 will have discharged in the interim and no signal will appear at the gate 68 thereof. Thus, the rectifier 64 fires under control of the sensing element 38 while the rectifier 70 will fire only if the rectifier 64 fires first. This arrangement provides a protective circuit for the transformer 50 which receives only complete cycles of A.C. power and never receives only a half-wave pulse which would cause a large D.C. component in the primary circuit with the likelihood of injury to some circuit component or blowing of the circuit fuse 96 to render the circuit inoperative.

To protect the rectifiers 64, 70, each is preferably provided with a parallel protective circuit. For example, connected in parallel with the rectifier 64 is a pair of diodes 100, 102 and a current limiting resistor 104. The diode 100 conducts to prevent the application of positive gate potential during the negative half-cycle of the input signal applied to the anode of the rectifier 64, and the diode 102 prevents the application of negative potential to the gate 62 at any time. Diodes 106, 108 and a current limiting resistor 110 similarly protect the rectifier 70.

The rapid response of the sensing element 38 to the temperature of the heater element 26 and the rapid response of the control circuit in turn enables very close control over the temperature of the heater element at the time of contacting the material to be sealed. Control of temperature within plus or minus two degrees Fahrenheit can easily be maintained. Thus close control over the temperature of the materials being sealed may be maintained with resultant more effective sealing.

It will be apparent that since the sheet 26 is self heated it can be heated or cooled rapidly permitting rapid start up of a sealing machine or rapid change of operating temperature if change of wrapping material so requires.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A heating unit for sealing sheets of heat sealable material, said unit comprising an elongate, generally rectangular body member having a face, a sheet-like, electrical resistance type heater element extending across said face, electrical insulator means disposed between said element and said body member, a pair of header elements each comprising a metal plate connected one to each of the opposite ends of said heater element across the width of said heater element, means for connecting said header elements to a source of electrical energy, and a wafer type temperature sensing element bonded to the surface of said heater element facing said body member so as to detect with a minimum of lag the temperature of said heater element.

2. A heating unit for a package sealing device, said unit comprising an elongate, generally rectangular body member having at least one relatively broad, flat face, a sheet-like electrical resistance type heater element extending lengthwise across said face and up and around each of the opposite ends of said body member, electrical insulator means disposed between said element and said body member, a pair of header elements each comprising an electrically conductive metal plate connected one to each of the opposite ends of said heater element across the width of said heater element, a source of electrical energy, means on each of said header elements connecting the same to said source, and a wafer type temperature sensing element bonded to the surface of said heater element facing said body member and responsive to changes in temperature therein, and control means connecting said sensing element to said source to control the application of energy to said heater element in response to signals from said sensing element.

3. A heating unit for a package sealing device, said unit comprising an elongate, generally rectangular body member having at least one relatively broad, flat face, a sheet-like, electrical resistance type heater element extending lengthwise across said face and up and around each of the opposite ends of said body member, electrical insulator means disposed between said element and said body member, a terminal block mounted on the surface of said body member opposite said face, a pair of header elements secured to said terminal block each comprising an electrically conductive metal plate connected one to each of the opposite ends of said heater element across the width of said heater element, a source of electrical energy, means on each of said header elements connecting the same to said source, and a wafer type temperature sensing element bonded to the surface of said heater element facing said body member and responsive to changes in temperature therein, and control means connecting said sensing element to said source to control the application of energy to said heater element in response to signals from said sensing element.

4. In a heat sealing device the combination comprising an electrical resistance type heater element, a temperature sensing element bonded to the surface of said heater element, said sensing element exhibiting changes in resistance in response to changes in the temperature of said heater element, a bridge circuit including said sensing element, a transformer having its secondary connected to said heater element, a source of alternating current connected to the primary winding of said transformer, one side of said primary being connected to said source through a switching circuit including a first and a second silicon controlled rectifier connected in parallel but in oppositely facing directions so as to pass current to said transformer through each half cycle of said alternating current, each of said rectifiers having a triggering gate, means connecting the gate of said first rectifier across said bridge circuit to apply a signal at said first rectifier gate in response to a predetermined drop in the temperature of said heater element to trigger the said first rectifier whereby current will flow through said first rectifier to said transformer through one half cycle of said alternating current, said last mentioned means including means to cause said signal to be applied at said first rectifier gate substantially at the instant the anode of said first rectifier becomes positive with respect to the cathode thereof, a circuit connected to the gate of said second rectifier responsive to current flow through said first rectifier to apply a triggering signal to said second rectifier whereby current will flow through said second rectifier during the other half cycle of said alternating current, said last mentioned circuit including a time delay means operative to apply the said signal to said second rectifier substantially at the instant the anode of said second rectifier becomes positive with respect to the cathode thereof.

5. In a heat sealing device the combination comprising an electrical resistance type heater element, a temperature sensing element bonded to the surface of said heater element responsive to changes in the temperature of said heater element for creating a signal, a transformer having its secondary connected to said heater element, a source of alternating current connected to the primary winding of said transformer, one side of said primary being connected to said source through a switching circuit including a first and a second silicon controlled rectifier connected in parallel but in oppositely facing directions so as to pass current to said transformer through each half cycle of said alternating current, each of said rectifiers having a triggering gate, means connecting the gate of said first rectifier to said sensing element to cause a signal to appear at said first rectifier gate in response to a predetermined drop in the temperature of said heater element and to trigger the said first rectifier to cause current to flow through said first rectifier and said transformer through one half cycle of said alternating current, and a feedback supply circuit connected to the gate of said second rectifier responsive to current flow through said first rectifier for triggering said second rectifier to cause current to flow through said second rectifier and said transformer through the other half cycle of said alternating current.

6. A switching circuit for controlling the supply of electrical energy to a device in response to a predetermined condition of said device, said circuit comprising a sensing element responsive to said device condition for generating a signal, a transformer having its secondary connected to said device, a source of alternating current connected to the primary winding of said transformer, one side of said primary being connected to said source through a switching circuit including a first and a second silicon controlled rectifier connected in parallel but in oppositely facing directions so as to pass current to said transformer through each half cycle of said alternating current, each of said rectifiers having a triggering gate, means connecting the gate of said first rectifier to said sensing element to cause a signal to appear at said first rectifier gate upon occurence of said predetermined condition of said device to trigger the said first rectifier to cause current to flow through said first rectifier and said transformer through one half cycle of said alternating current, and means responsive to current flow through said first rectifier for triggering said second rectifier to cause current to flow through said second rectifier and said transformer during the other half cycle of said alternating current.

7. A switching circuit for controlling the supply of electrical current to a device in response to a predetermined condition of such said device, said circuit comprising: a sensing element responsive to said predetermined condition for generating the trigger signal, a transformer having its secondary winding connected to said device, a source of alternating current connected to the primary winding of said transformer, one side of said primary winding being connected to said source through a switching circuit including a first controlled rectifier and a second controlled rectifier connected in parallel but of opposite polarity so as to transmit current from said source to said transformer for each half-cycle when said rectifiers are rendered conducting, each of said rectifiers having a control electrode, means connecting the control electrode of said first rectifier to said sensing element to apply said trigger signal to said control electrode of said first rectifier upon the occurrence of said predetermined conduction in order to render said first rectifier conducting during one half-cycle of said alternating current, and means responsive to current flow through said first rectifier for applying a second trigger signal to the control electrode of said second rectifier in order to render said second rectifier conducting during the other half-cycle of said alternating current.

References Cited in the file of this patent

UNITED STATES PATENTS

| | | |
|---|---|---|
| 2,521,282 | Butler | Sept. 5, 1950 |
| 2,552,480 | Dickey | May 8, 1951 |
| 2,609,316 | Fichtner | Sept. 2, 1952 |
| 2,644,151 | Krueger | June 30, 1953 |
| 2,713,130 | Weiller | July 12, 1955 |
| 2,735,797 | Schjedahl | Feb. 21, 1956 |
| 2,802,086 | Fener | Aug. 6, 1957 |
| 2,804,419 | De Woskin | Aug. 27, 1957 |
| 2,825,789 | Scott | Mar. 4, 1958 |
| 2,829,231 | Troast | Apr. 1, 1958 |
| 2,920,240 | Macklem | Jan. 5, 1960 |
| 2,929,968 | Henisch | Mar. 22, 1960 |

OTHER REFERENCES

Industrial and Engineering Chemistry, vol. 47, No. 3, March 1955, pages 386–391.